W. BUTTLER.
ICE CREAM CONTAINING CABINET AND SODA FOUNTAIN.
APPLICATION FILED JAN. 2, 1909.

930,528.

Patented Aug. 10, 1909.
2 SHEETS—SHEET 1.

WITNESSES:
W. M. Defrees
C. E. King

INVENTOR
William Buttler
BY
Thompson R. Bell
ATTORNEY

W. BUTTLER.
ICE CREAM CONTAINING CABINET AND SODA FOUNTAIN.
APPLICATION FILED JAN. 2, 1909.
930,528.
Patented Aug. 10, 1909.
2 SHEETS—SHEET 2.
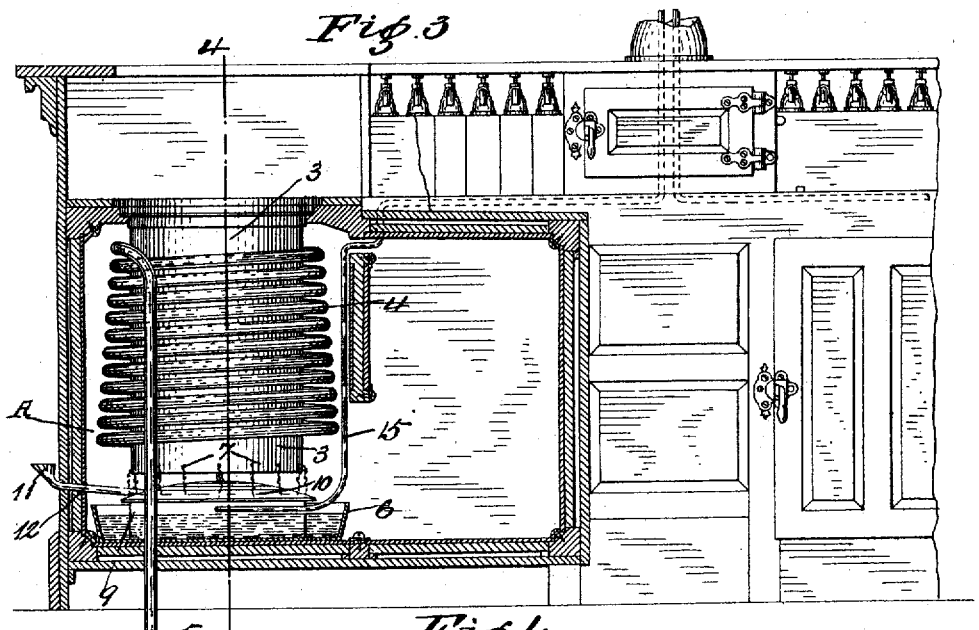
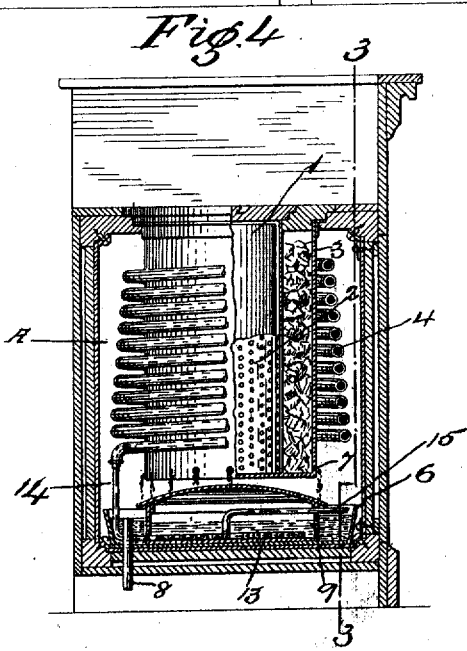
WITNESSES:
U. U. Defrees
C. E. King
INVENTOR
William Buttler
BY
Thompson & Bell
ATTORNEY

UNITED STATES PATENT OFFICE.

WILLIAM BUTTLER, OF INDIANAPOLIS, INDIANA.

ICE-CREAM-CONTAINING CABINET AND SODA-FOUNTAIN.

No. 930,528.　　　　Specification of Letters Patent.　　Patented Aug. 10, 1909.

Application filed January 2, 1909. Serial No. 470,305.

*To all whom it may concern:*

Be it known that I, WILLIAM BUTTLER, a citizen of the United States, residing at Indianapolis, in the county of Marion and State of Indiana, have invented certain new and useful Improvements in Ice-Cream-Containing Cabinets and Soda-Fountains, of which the following is a specification, reference being had therein to the accompanying drawing.

My invention relates to improvements in ice cream cooling cabinets and soda water fountains, as hereinafter described in the specification and particularly pointed out in the claims.

The object of this invention is to provide a cabinet in which the cooler means thereof is so arranged that the freezing mixture used to keep the ice cream cool in the cabinet, will also keep the interior refrigerating chambers of the cabinet at the low temperature required in cooling soda water. I attain this object by means of the cabinet illustrated in the accompanying drawings in which like characters of reference designate like parts throughout the several views.

Figure 1:
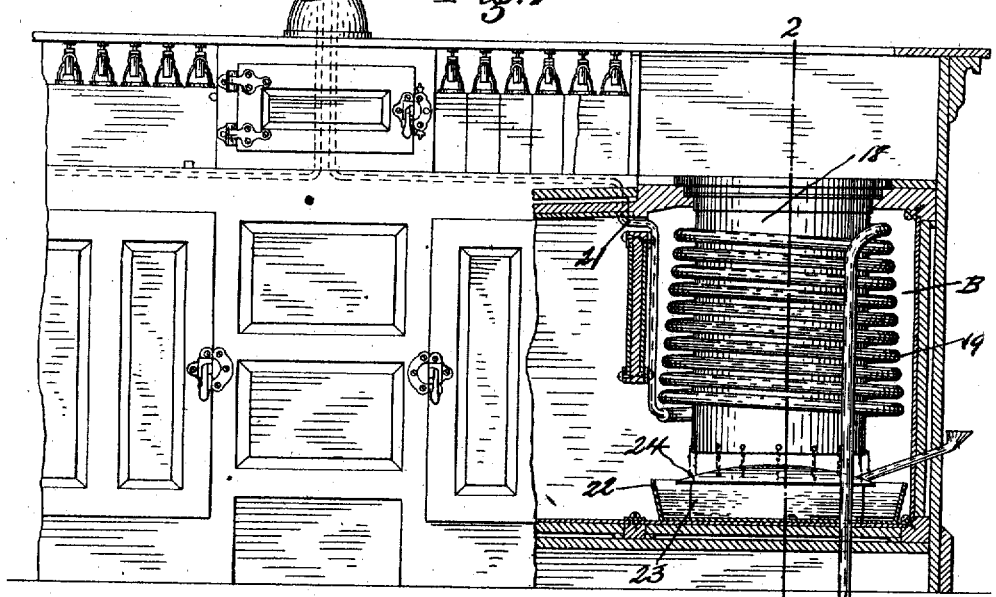
Figure 2:
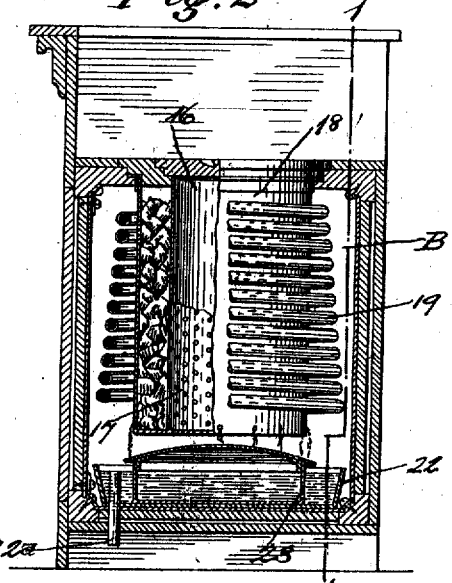

Figure 1 is an elevational view of the ice cream cabinet showing the right-hand portion thereof in section and taken along the line 1—1 in Fig. 2; Fig. 2 shows at the left a transverse sectional elevational view taken along the line 2—2 in Fig. 1 and at the right the corresponding parts in elevation; Fig. 3 is an elevational view of the refrigerant cabinet showing the left-hand portion thereof in section and taken along the line 3—3 in Fig. 4; and, Fig. 4 shows at the right a transverse sectional view taken along the line 4—4 in Fig. 3 and at the left the corresponding parts in elevation.

The left-hand portion of the cabinet shown in Fig. 1 is identical with the right-hand portion shown in Fig. 3, and the arrangement of the cooling means shown in Figs. 1 and 2 is similar to the arrangement shown in Figs. 3 and 4, the difference between which arrangements will be made clear in the following description.

The ice cream compartments A and B of the cabinet are preferably situated at the ends of the cabinet. I will first describe the cooling and refrigerating apparatus contained in the left-hand compartment A.

The ice cream receptacle 1 is adapted to loosely fit in the perforated separating vessel 2 which vessel is situated centrally in the refrigerant containing tank 3 and said perforated vessel is provided to prevent the refrigerant from contacting directly with the ice cream receptacle, so that the latter receptacle may readily be removed and replaced by another when such is desired. The space between the perforated separating vessel 2 and the refrigerant containing tank 3 is filled with a refrigerant which is usually composed of rock salt and broken ice, and said refrigerant maintains the ice cream contained in the ice cream receptacle 1 at a low temperature. A primary pipe-coil 4 surrounds the refrigerant containing tank 3 and the said coil is preferably conical in form with its larger end situated toward the bottom of the ice cream compartment, so that the lower members of the coil will be situated farther from the refrigerant tank than the upper members thereof, for the reason that the air contained in said ice cream compartment is much cooler in the bottom portion of said compartment than in the top portion, and the temperature of the refrigerant containing tank is practically equally as cold at its top portion as at its bottom portion, consequently the lower portion of said pipe-coil 4 is made larger in diameter than the top portion, so that said coil, at its bottom end, may be further removed from the surface of said refrigerant containing tank and beyond its direct cooling influence and therefore have the bottom portion of said coil situated to be cooled only by the cold air contained in the lower portion of the said compartment; thus it will be seen that as the fluid is circulated through the coil 4 from the top smaller end to the bottom larger end thereof, which larger end is situated farther from the outer bottom surface of said refrigerant containing tank, that consequently the temperature of the fluid contained in said upper portion of said coil is in a great degree cooled by said refrigerant containing tank, and the temperature of the fluid contained in said lower portion of said coil is not influenced by the lower portion of said refrigerant containing tank, and the temperature of the entire surface of said coil is therefore equalized, and the fluid passing therethrough is subjected to an almost uniform cooling temperature. The members of the pipe-coil 4, are spaced apart so that there will be air space between the several members of the coil so as to permit the air cooled by the refrigerant tank to circulate freely around them to cool them. It has been found by experience that when the pipe-coil 4, surrounding said refrigerant containing tank, contacts at the bottom with the latter tank the carbonated water in said coil will freeze. A pipe 5 extends from the tank charged with carbonated water situated in a cellar under the cabinet or other convenient place, and connected at its top end to the top member of the pipe-coil 4.

A drip pan 6 is situated under the refrigerant containing tank 3 and the same is provided for the purpose of catching the refrigerant fluid that may drip from the said refrigerant containing tank 3 through the lower openings 7. The drip pan 6 is provided with an over-flow pipe 8 which is provided for the purpose of maintaining the level of the refrigerant fluid in the pan constant. A plain water containing pan 9 is situated in said refrigerant fluid pan 6 directly under the refrigerant containing vessel 7 and the said pan is provided with a removable concavo-convex lid or cover 10, which lid 10 is provided for the purpose of conducting the drippings from the refrigerant containing tank into the refrigerant fluid pan and preventing the refrigerant fluid getting into the plain water tank 9.

A funnel 11 is provided with a pipe 12 which connects with the interior of the plain water pan 9. Said funnel is provided for the purpose of supplying plain water to the pan 9 without necessitating the opening of the door and the removal of the lid 10.

A flat coil 13 rests on the inner side of the bottom of the pan 9, and a pipe 14 connects said coil to the lower member of the primary coil 4, and a pipe 15 is connected to said coil 13 and extends therefrom to a dispensing faucet situated centrally of the cabinet.

I will now preceed to describe the cooling and refrigerating apparatus contained in the right-hand compartment B which apparatus is similar to that contained in the left-hand compartment A. The ice cream receptacle 16 is adapted to loosely fit in the perforated chamber 17 which latter vessel is situated centrally of the refrigerant containing tank 18. The space between the perforated vessel 17 and the refrigerant tank 18 is filled with a refrigerant as hereinbefore described. The pipe coil 19 surrounds the refrigerant tank 18 and the said coil is similar to the coil 4 in form and construction. A pipe 20 is connected to a water supply pipe at one of its ends and at its upper end to the top member of the pipe-coil 19. A draft pipe 21 extends from the end of the bottom member of the coil 19 to a suitable dispensing faucet (not shown) situated centrally of the cabinet. A drip-pan 22 having its top portion open is situated under the refrigerant containing tank 18 and is provided for the purpose of catching the refrigerant fluid that may drip from said refrigerant containing tank. This pan is similar in every respect to the pan 6 and is provided with an over-flow pipe 22 which maintains the level of the refrigerant fluid collected in said pan constant. A plain water containing pan 23 is situated in said refrigerant fluid collecting pan and the said pan is provided with a removable concavo-convex lid or cover 24 which lid or cover is provided for the purpose of conducting the drippings from the refrigerant containing tank into the brine containing pan as previously described. The plain water containing pan 23 therefore is used as a refrigerator in which the plain water is frozen into ice which ice may be removed and used by the dispenser.

I am aware that ice cream cabinets have been made with upper cooling coil members arranged to surround the outer surfaces of refrigerant containing tanks, and, also aware that cooling coils have been used in connection with said upper cooling coils and situated under the refrigerant tank in relative position to receive the drippings of the refrigerant from said tank, but this arrangement of the cooling coils I do not claim broadly as my invention.

What I do claim is:—

1. In a soda fountain and cabinet, the combination with a refrigerant containing tank, an ice cream receptacle situated in said refrigerant containing tank, and a primary coil of metal pipe surrounding said tank, of a refrigerant plain water containing pan situated under said refrigerant containing tank, a removable roof or cover on said pan, a secondary pipe-coil situated in and immersed in the water contained in said refrigerating pan said secondary pipe-coil connected to said primary coil, and a draft pipe extending from said secondary coil pipe to be connected to a dispensing faucet.

2. In a soda fountain and cabinet, the combination with a refrigerant containing tank, an ice cream receptacle situated in said refrigerant containing tank, and a primary coil of metal pipe constructed in the form of a cone and surrounding said refrigerant containing tank with its base or larger end situated downwardly, of a refrigerating plain water containing pan situated under said refrigerant containing tank, a removable roof or cover on said pan, a secondary pipe-coil situated and immersed in the water contained in said refrigerating pan, said pipe-coil connected to said primary coil, and a draft pipe extending from said secondary coil pipe to be connected to a dispensing faucet.

3. In a soda fountain and cabinet, the combination with a refrigerant containing tank, an ice cream receptacle situated in said refrigerant containing tank, and a primary coil of metal pipe surrounding said tank, of an open topped drip pan situated under said refrigerant containing tank, an over-flow pipe extending from said drip pan, of a refrigerant plain water containing pan situated in said drip pan and under said refrigerant containing tank, a removable cover or roof on said refrigerating pan, a secondary pipe-coil situated and immersed in the plain water contained in said refrigerating pan, said secondary pipe-coil connected to said primary coil, and a draft pipe extending from said secondary coil to be connected to a dispensing faucet.

4. In a soda fountain and cabinet, the combination with a refrigerant containing tank, an ice cream receptacle situated in said refrigerant containing tank, a primary coil of metal surrounding said tank, a pipe extending from a source of supply and connected to the top end of said coil, and a draft pipe extending from the bottom end of said coil to be connected to a dispensing faucet, of an open topped drip pan situated under said refrigerant containing tank, a refrigerating plain water containing pan situated in said drip pan and under said refrigerant containing tank, a removable cover on said refrigerant pan, and means for supplying water to said refrigerating pan.

In testimony whereof I affix my signature in presence of two witnesses.

WILLIAM BUTTLER.

Witnesses:
THOMPSON R. BELL,
FRANCIS M. SPRINGER.